United States Patent [19]

Krull et al.

[11] Patent Number: 5,391,632
[45] Date of Patent: Feb. 21, 1995

[54] TERPOLYMERS BASED ON α,β-UNSATURATED DICARBOXYLIC ANHYDRIDES, α,β-UNSATURATED COMPOUNDS AND POLYOXYALKYLENE ETHERS OF LOWER UNSATURATED ALCOHOLS

[75] Inventors: Matthias Krull, Bad Soden/Ts; Michael Feustel, Kelkheim/Taunus, both of Germany

[73] Assignee: Hoechst Aktiengesellschaft, Frankfurt am Main, Germany

[21] Appl. No.: 177,906

[22] Filed: Jan. 6, 1994

[30] Foreign Application Priority Data

Jan. 6, 1993 [DE] Germany .................. 4300128

[51] Int. Cl.⁶ ............................................ C08F 8/32
[52] U.S. Cl. ..................... 525/327.6; 525/327.7; 525/384; 525/379; 525/382; 526/271
[58] Field of Search ............. 526/271; 525/327.6, 525/327.7, 384, 379, 382

[56] References Cited

U.S. PATENT DOCUMENTS

| | | | |
|---|---|---|---|
| 4,511,369 | 4/1985 | Denis et al. | 44/62 |
| 4,670,516 | 6/1987 | Sackmann et al. | |
| 4,758,365 | 7/1988 | Neunier et al. | 526/271 |
| 4,900,332 | 2/1990 | Denis et al. | 44/62 |
| 5,142,036 | 8/1992 | Akimoto et al. | 526/271 |

FOREIGN PATENT DOCUMENTS

| | | | |
|---|---|---|---|
| 656041 | 1/1963 | Canada | 526/271 |
| 2032246 | 6/1991 | Canada . | |
| 0112195 | 6/1984 | European Pat. Off. . | |
| 0154177 | 9/1985 | European Pat. Off. . | |
| 0283293 | 9/1988 | European Pat. Off. . | |
| 0315021 | 5/1989 | European Pat. Off. | 526/271 |
| 2613371 | 10/1988 | France . | |
| 453476 | 12/1948 | Japan | 526/271 |
| 5421488 | 2/1979 | Japan | 526/271 |
| 64-108 | 1/1989 | Japan | 526/271 |
| 2138317 | 5/1990 | Japan | 526/271 |
| 9007609 | 7/1990 | WIPO | 526/271 |
| 92/07010 | 4/1992 | WIPO . | |

Primary Examiner—Joseph L. Schofer
Assistant Examiner—N. Sarofim
Attorney, Agent, or Firm—Connolly & Hutz

[57] ABSTRACT

Terpolymers based on α,β-unsaturated dicarboxylic anhydrides, α,β-unsaturated compounds and polyoxyalkylene ethers of lower unsaturated alcohols.

The present invention relates to terpolymers based on α,β-unsaturated dicarboxylic anhydrides, α,β-unsaturated compounds and polyoxyalkylene ethers as defined in claim 1, and also a process for preparing the same as defined in claim 5.

The invention likewise relates to a mixture of at least one terpolymer as defined in claim 1 and at least one ethylene-vinyl ester copolymer.

The terpolymers of the invention, and mixtures thereof, are used as paraffin inhibitors in crude oils and petroleum products.

16 Claims, No Drawings

TERPOLYMERS BASED ON α,β-UNSATURATED DICARBOXYLIC ANHYDRIDES, α,β-UNSATURATED COMPOUNDS AND POLYOXYALKYLENE ETHERS OF LOWER UNSATURATED ALCOHOLS

DESCRIPTION

Terpolymers based on α,β-unsaturated dicarboxylic anhydrides, α,β-unsaturated compounds and polyoxyalkylene ethers of lower unsaturated alcohols.

Mineral oils and mineral oil distillates, such as diesel fuel or heating oil, generally contain a proportion of dissolved n-paraffins which crystallize out on lowering of the temperature and can thereby lead to a deterioration of the flow properties of these oils or distillates. During transport of mineral oils through pipelines, this can lead to deposits on the wall and in particular cases (for example, while a pipeline is shut down) even lead to complete blockage of the pipeline. Precipitation of paraffins can also lead to complications during the storage and further processing of the mineral oils. In the case of mineral oil distillates, the crystallization can result in blockage of the filters in diesel engines and furnaces.

Apart from the classical methods of overcoming these paraffin problems (thermally, mechanically or by means of solvents), which only relate to the removal of the precipitates already formed, recent years have seen the development of a number of chemical additives (paraffin inhibitors) which, by means of physical interaction with the precipitating paraffin crystals, lead to a modification of the shape, size and adhesion properties of the crystals. Here the additives act as additional crystal nuclei and partly crystallize out with the paraffins; part of their action is also explained by dispersion of the crystals. The modified crystals have less tendency to form deposits, are also smaller and possess an altered crystal form. Oils mixed with additives can still be pumped or processed at temperatures which are often more than 20° C. lower than for oils not containing additives. Some copolymers based on maleic anhydride and α,β-unsaturated compounds are known as paraffin inhibitors for crude oils and mineral oil distillates.

EP-B-0 154 177 describes reaction products of copolymers based on maleic anhydride and α,β-unsaturated compounds with primary monoalkylamines and/or aliphatic alcohols. These copolymers are particularly suitable as paraffin inhibitors for paraffin-containing petroleum products, for example crude oils and distillation residues from petroleum refining.

EP-A-0 436 151 discloses reaction products of copolymers based on maleic anhydride and α,β-unsaturated compounds such as styrene with dialkylamines. These copolymers are added to petroleum middle distillates in amounts of from 50 to 1000 ppm, preferably from 100 to 500 ppm. Such petroleum middle distillates generally already contain flow improvers such as ethylene-vinyl ester copolymers.

EP-A-0 283 293 discloses copolymers derived from the polymerization of an aliphatic olefin with maleic anhydride, where the copolymer must contain both an ester group and also an amide group, each of which contains an alkyl group having at least 10 carbon atoms, and also copolymers from the reaction of a secondary amine with a polymer containing anhydride groups, where equal amounts of amides and amine salts are produced from the anhydride groups.

The as yet unpublished German Patent Application P 41 23 795.1 relates to copolymers of ethylenically unsaturated carboxylic esters with polyoxyalkylene ethers of lower unsaturated alcohols and also to their use in paraffin-containing oils, such as crude oils, residual oils and oil distillates.

However, the paraffin-inhibiting activity of the known paraffin inhibitors is inadequate, in particular in middle distillates, so that cooling can result in the formation of paraffin crystals, some large, which form a sediment because of their relatively high density and can lead to a paraffin-rich layer at the bottom and a paraffin-depleted upper layer.

It has now been found that, despite the known difficulties in using allyl compounds as monomers (H.-G. Elias, Makromoleküle [Macromolecules], 4th edition (1981), pp. 571, 581, 585), it is likewise possible to use terpolymers based on α,β-unsaturated dicarboxylic anhydrides, α,β-unsaturated compounds and polyoxyalkylene ethers of lower unsaturated alcohols.

It has likewise been found that addition of alcohol/amine-modified terpolymers based on α,β-unsaturated dicarboxylic anhydrides, α,β-unsaturated compounds and polyoxyalkylene ethers of lower unsaturated alcohols, if desired in admixture with known paraffin inhibitors, preferably copolymers based on ethylene and vinyl acetate, results in the paraffin crystals which precipitate on cooling remaining dispersed. As a result of this uniform dispersion, a homogeneously turbid phase is obtained in which the CFPP (cold filter plugging point) value, which is critical for operability, of the upper and lower phases is approximately the same.

The invention provides terpolymers based on α,β-unsaturated dicarboxylic anhydrides, α,β-unsaturated compounds and polyoxyalkylene ethers of lower unsaturated alcohols, which comprise 20–80 mol %, preferably 40–60 mol %, of bivalent structural units A, B and/or C

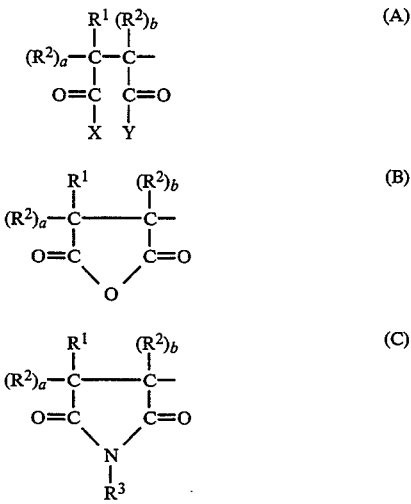

where
R$^1$ and R$^2$ are, independently of one another, hydrogen or methyl,
a and b are equals zero or one and a+b is one,
X and Y are identical or different and are the —N—HR$^3$ group
where R$^3$ is C$_6$–C$_{40}$-alkyl, C$_5$–C$_{20}$-cycloalkyl or C$_6$–C$_{18}$-aryl, the —N—(R$^3$)$_2$ group where $R^3$ is identical or different and is as defined above, and/or the —O—$R^4$, group where $R^4$ is hydrogen, a cation of the formula $H_2N^{\oplus}(R^3)_2$ or $H_3N^{\oplus}R^3$, $C_6$–$C_{40}$-alkyl, $C_5$–$C_{20}$-cycloalkyl or $C_6$–$C_{18}$-aryl, preferably phenyl, 19–80 mol %, preferably 39–60 mol %, of bivalent structural units D

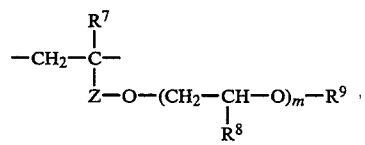
(D)

in which $R^5$ is hydrogen or $C_1$–$C_4$-alkyl and $R^6$ is $C_6$–$C_{60}$-alkyl or $C_6$–$C_{18}$-aryl, and 1–30 mol %, preferably 1–20 mol %, of bivalent structural units E $$\begin{array}{c} R^7 \\ | \\ -CH_2-C- \\ | \\ Z-O-(CH_2-CH-O)_m-R^9 \\ | \\ R^8 \end{array} \quad (E)$$

in which $R^7$ is hydrogen or methyl, $R^8$ is hydrogen or $C_1$–$C_4$-alkyl,

Z is $C_1$–$C_4$-alkylene, m is a number from 1 to 100, $R^9$ is $C_1$–$C_{24}$-alkyl, $C_5$–$C_{20}$-cylcoalkyl, $C_6$–$C_{18}$-aryl or —C(O)—$R^{10}$, where $R^{10}$ is $C_1$–$C_{40}$-alkyl, $C_5$–$C_{10}$-cycloalkyl or $C_6$–$C_{18}$-aryl.

The abovementioned alkyl, cylcoalkyl and aryl radicals may be unsubstituted or substituted. Suitable substituents of the alkyl and aryl radicals are, for example, ($C_1$–$C_6$)-alkyl, halogens such as fluorine, chlorine, bromine and iodine, preferably chlorine, and ($C_1$–$C_6$)-alkoxy.

Alkyl ($R^3$, $R^4$) is, according to the invention, generally a straight-chain or branched hydrocarbon radical having 6–40, preferably 10–24, carbon atoms. Individual mention may be made of: n-hexyl, n-octyl, decyl, dodecyl, tetradecyl, hexadecyl, octadecyl, dodecenyl, tetrapropenyl, tetradecenyl, pentapropenyl, hexadecenyl, octadecenyl and eicosyl or mixtures such as coconut alkyl, tallow alkyl and behenyl.

Cylcoalkyl ($R^3$, $R^4$, $R^9$ and $R^{10}$) is, according to the invention, generally a cyclic aliphatic radical having 5–20 carbon atoms. Preferred cyclocalkyl radicals are cyclopentyl and cyclohexyl.

The terpolymers of the invention comprise the bivalent structural units A, B, and/or C and also D and E. They additionally contain only, in a manner known per se, the terminal groups formed during the polymerization by initiation, inhibition and chain termination.

In detail, the structural units A, B and C are derived from $\alpha,\beta$-unsaturated dicarboxylic anhydrides of the formula F and/or G

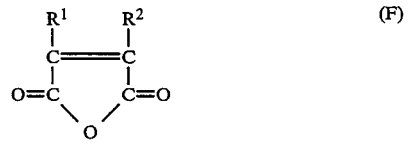
(F)

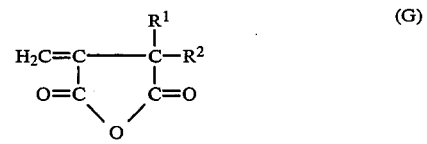
(G)

such as maleic anhydride, itaconic anhydride and citraconic anhydride, preferably maleic anhydride.

The structural units D are derived from the $\alpha,\beta$-unsaturated compounds of the formula H.

(H)

Examples which may be mentioned are the following $\alpha,\beta$-unsaturated compounds: styrene, $\alpha$-methylstyrene, dimethylstyrene, $\alpha$-ethylstyrene, diethylstyrene, i-propylstyrene, tert-butylstyrene, diisobutylene and $\alpha$-olefins such as decene, dodecene, tetradecene, pentadecene, hexadecene, octadecene, $C_{20}$-$\alpha$-olefin, $C_{24}$-$\alpha$-olefin, $C_{30}$-$\alpha$-olefin, tripropenyl, tetrapropenyl, pentapropenyl and mixtures thereof. Preference is given to $\alpha$-olefins having from 10 to 24 carbon atoms and styrene, particularly preference being given to $\alpha$-olefins having from 12 to 20 carbon atoms.

The structural units E are derived from the polyoxyalkylene ethers of lower unsaturated alcohols of the formula J.

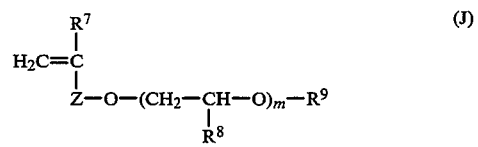
(J)

The monomers of the formula J are etherification products ($R^9$=—C(O)$R^{10}$) or esterification products ($R^9$=—C(O)$R^{10}$) of polyoxyalkylene ethers ($R^9$=H).

The polyoxyalkylene ethers ($R^9$=H) can be prepared by known processes by the addition reaction of $\alpha$-olefin oxides, such as ethylene oxide, propylene oxide and/or butylene oxide, with polymerizable lower unsaturated alcohols of the formula K

(K)

Such polymerizable lower unsaturated alcohols are, for example, allyl alcohol, methylallyl alcohol, butenols such as but-3-en-1-ol and but-1-en-3-ol, or methylbutenols such as 2-methylbut-3-en-1-ol, 2-methylbut-3en-2-ol and 3-methylbut-3-en-1-ol. Preference is given to addition products of ethylene oxide and/or propylene oxide with allyl alcohol.

Subsequent etherification of these polyoxyalkylene ethers to form compounds of the formula J where $R^9 = C_1$ to $C_{24}$-alkyl, cycloalkyl or aryl is carried out by processes known per se. Suitable processes are known, for example, from J. March, Advanced Organic Chemistry, 2nd Edition, p. 357 ff. (1977).

These etherification products of the polyoxyalkylene ethers can also be prepared by the addition reaction of α-olefin oxides, preferably ethylene oxide, propylene oxide and/or butylene oxide, with alcohols of the formula L $$R^9\text{—OH} \qquad (L)$$

in which $R^9$ is $C_1$-$C_{24}$-alkyl, $C_5$-$C_{20}$-cycloalkyl or $C_6$-$C_{18}$-aryl, by known processes and reaction with polymerizable lower unsaturated halides of the formula M

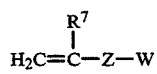

where W is a halogen atom and $R^7$ and Z are as defined above. Preferred halides are the chlorides and bromides. Suitable methods of preparation are given, for example, in J. March, Advanced Organic Chemistry, 2nd Edition, p. 357 ff. (1977).

The esterification of the polyoxyalkylene ethers ($R^9$=—C(O)—$R^{10}$) is carried out by reaction with common esterifying agents such as carboxylic halides, carboxylic anhydrides or carboxylic esters with $C_1$-$C_4$-alcohols. Preference is given to using the halides and anhydrides of $C_1$-$C_{40}$-alkyl-, $C_5$-$C_{10}$-cylcoalkyl- or $C_6$-$C_{18}$-arylcarboxylic acids. The esterification is generally carried out at temperatures of from 0° to 200° C., preferably from 10° to 100° C. The carboxylic acid derivative is generally used in a stoichiometric mount based on the alcohol group of the polyoxyalkylene ether. However, it is possible to add the acid component in excess, for example in an excess from 20 to 100%, and also in a substoichiometric amount. The esterification is expediently carried out in a solvent. Suitable solvents are, for example, aromatic hydrocarbons, for example alkylaromatics such as toluene, xylene, trimethylbenzenes, dimethylethylbenzenes, dimethylnaphthalene, and mixtures of aromatics.

For the monomers of formula J, the index m gives the degree of alkoxylation, i.e. the number of moles of α-olefin oxide adducted per mole of the formula K or L.

The structural unit A contains the groups —$NHR^3$, —$N(R^3)_2$ and/or —$OR^4$, which are derived from primary a mines of the formula (N) $NH_2R^3$, the secondary mines of the formula (P) and the alcohols of the formula (Q) HO—$R^4$.

Examples which may be mentioned of primary amines are: n-hexylamine, n-octylamine, n-tetradecylamine, n-hexadecylamine, n-stearylamine and N,N-dimethylaminopropylenediamine, cyclohexylamine, dehydroabietylamine and mixtures thereof.

Examples which may be mentioned of secondary amines are: didecylamine, ditetradecylamine, distearylamine, dicoconut fatty amine and ditallow fatty amine, and mixtures thereof.

In the context of the invention, relatively short and/or long-chain alcohols ($C_6$-$C_{40}$) of the formula $$\text{HO—}R^4 \qquad (Q)$$

are used.

Alcohols of this type are known per se. Examples which may be mentioned are n-butanol, n-hexanol, n-octanol, n-dodecanol and, as relatively long-chain alcohols, stearyl alcohol, behenyl alcohol or the alcohols known as ®Alfols (Condea) which have a hydrocarbon-chain length of up to 40 carbon atoms.

According to the invention, a cation ($R^4$) is an ammonium cation of the formula $H_2N^\oplus(R^3)_2$ or $H_3N^\oplus R^3$.

The terpolymers of the invention possess K values (measured by the method of Ubbelohde in 5% strength by weight solution in toluene at 25° C.) of from 8 to 100, preferably from 8 to 50, corresponding to average molecular weights ($\overline{M}_w$) of between about 500 and 100,000.

The proportion of the individual bivalent structural units A to E in the terpolymers of the invention is essentially determined by the mixing ratios of the reactants used.

The invention also provides a process for preparing the terpolymers of the invention based on α,β-unsaturated dicarboxylic anhydrides, α,β-unsaturated compounds and polyoxyalkylene ethers of lower unsaturated alcohols, which comprises first polymermizing with one other monomers of the formula F and/or G

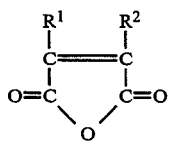

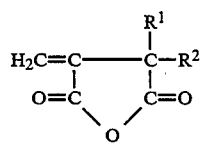

where $R^1$ and $R^2$ are, independently of one another, hydrogen or methyl, monomers of the formula H

where $R^5$ is hydrogen or $C_1$-$C_4$-alkyl and $R^6$ is $C_6$-$C_{60}$-alkyl or $C_6$-$C_{18}$-aryl, and monomers of the formula J

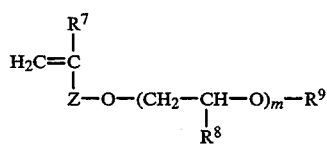

in which
$R^7$ is hydrogen or methyl,
$R^8$ is hydrogen or $C_1$-$C_4$-alkyl,
Z is $C_1$-$C_4$-alkylene,
m is a number from 1 to 100,
$R^9$ is $C_1$-$C_{24}$-alkyl, $C_5$-$C_{20}$-cycloalkyl, $C_6$-$C_{18}$-aryl or —C(O)—$R^{10}$, where
$R^{10}$ is $C_1$-$C_{40}$-alkyl, $C_5$-$C_{10}$-cycloalkyl or $C_6$-$C_{18}$-aryl, and subsequently reacting the product with primary and/or secondary amines of the formulae $$\text{—N—}H_2R^3, \qquad (N)$$

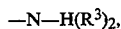   (P)

where $R^3$ is $C_6$–$C_{40}$-alkyl, $C_5$–$C_{20}$-cycloalkyl or $C_6$–$C_{18}$-aryl, and/or alcohols of the formula

   (Q)

where $R^4$ is $C_6$–$C_{40}$-alkyl, $C_5$–$C_{20}$-cycloalkyl or $C_6$–$C_{18}$-aryl, preferably phenyl.

The polymerization is carried out using known batch or continuous polymerization processes, such as bulk, suspension, precipitation or solution polymerization, and initiation by suitable free-radical initiators, for example hydroperoxides, peroxides or azo compounds, such as dilauroyl peroxide, dibenzoyl peroxide, t-butyl perpivalate, t-butyl permaleate, t-butyl perbenzoate, dicumyl peroxide, t-butyl cumyl peroxide, di-t-butyl peroxide, cumene hydroperoxide, t-butyl hydroperoxide, 2,2'-azo-bis(2-methylpropanonitril), 2,2'-azobis(2-methylbutyronitril) and mixtures of these. These initiators are generally used in amounts of from 0.1 to 20% by weight, preferably from 0.2 to 10% by weight, based on the monomers.

The molar ratios between the α,β-unsaturated dicarboxylic anhydrides, α,β-unsaturated compounds and polyoxyalkylene ethers of lower unsaturated alcohols are between 1:0.5–2:0.01–0.5, preferably 1:0.9–1.1:0.04–0.2.

The polymerization is generally carried out at temperatures of 40°–400° C., preferably 80°–250° C., and when α,β-unsaturated compounds or solvents having boiling points below the polymerization temperature are used, it is expediently carried out under pressure. The polymerization is expediently carried out with the exclusion of air, for example under nitrogen, since oxygen interferes with the polymerization. When selecting the initiator or the initiator system it is expedient to ensure that the half-life of the initiator or the initiator system is less than 3 hours at the selected polymerization temperature.

To obtain low-molecular-weight copolymers it is frequently expedient to carry out the polymerization in the presence of regulators known per se. Suitable regulators are, for example, organic mercapto compounds, such as 2-mercaptoethanol, 2-mercaptopropanol, mercaptoacetic acid, mercaptopropionic acid, tert-butyl mercaptan, n-butyl mercaptan, n-octyl mercaptan, n-dodecyl mercaptan and tert-dodecyl mercaptan, which are generally used in amounts of from 0.1% by weight to 10% by weight.

Suitable apparatuses for the polymerization are, for example, conventional stirred reactors with, for example, anchor, blade, impeller or multistage-impulse counter-current stirrer, and for continuous production, cascades of stirred reactors or static mixers.

A preferred process for preparing the terpolymers of the invention is solution polymerization. It is carried out in solvents in which the monomers and terpolymers formed are soluble. Suitable solvents are all those which fulfil this requirement and do not undergo reaction with the monomers or with the terpolymers formed. For example, these are organic, preferably aromatic, solvents such as cumene, toluene, xylene, ethylbenzene or commercial solvent mixtures such as ®Solvent Naphtha, ®Shellsol AB or ®Solvesso 150, 200, 250.

In the preparation, all the monomers can be initially charged and polymerized by addition of a free-radical initiator and application of heat. However, the solvent and a proportion of the monomers (for example about 5-20%) is expediently charged initially and the remainder of the monomer mixture metered in with the initiator and any coinitiator and regulator used. Preferably, the solvent and α,β-unsaturated compounds of the formula H, particularly $C_4$–$C_{60}$-α-olefins, are initially charged into the polymerization reactor and after the polymerization temperature has been attained the acid anhydride group-containing monomer of the formula F and/or G and also the monomer of the formula J, both dissolved in solvent if desired, and the initiator and also any coinitiator and regulator used are metered in.

The concentration of the monomers to be polymerized is between 20 and 95% by weight, preferably between 50 and 90% by weight.

The solid terpolymer can be isolated by precipitation with suitable non-solvents, such as acetone or methanol, or by evaporation of the solvent. However, it is expedient to select for the polymerization a solvent in which the further reaction with amines and/or alcohols can be carried out. Generally it is an advantage to use the anhydrides of the dicarboxylic acids instead of the free acids for the polymerization, since these react better with olefins and can subsequently be reacted selectively with amines and/or alcohols. The use of the corresponding dicarboxylic acids, is, however, not excluded.

After the polymerization, the reaction with amines of the formula N or P and/or alcohols of the formula Q is carried out.

The reaction of the terpolymers with the primary and/or secondary amines is carried out at temperatures between 30° and 250° C. over a period of from 0.5 to 20 hours. The primary and/or secondary amine, preferably fatty amine, is used in amounts from about 1 to 2 mol per mol of copolymerized dicarboxylic anhydride, i.e. about 0.9–2.5 mol per mol. The use of larger or smaller amounts is possible, but gives no advantage.

If 2 mol of a secondary amine are used, amide-ammonium salts are obtained at low reaction temperatures (30°–120° C.). The formation of a second amide group requires temperatures above 120° C., longer residence times and removal of water. If amounts of less than 1 mol are used, complete conversion to the monoamide does not take place. The selection of the reaction conditions/derivative depends on the application.

In the reaction of the terpolymers with primary and/or secondary a mines N or P and/or alcohols of the formula Q, the reaction of the terpolymers with the alcohol to give the mono- or diester is expediently carried out first. The degree of reaction of the anhydride groups with the alcohols is generally between 60 and 95 mol %. The entire amount or a proportion of the partially esterified terpolymers are then reacted with the primary and/or secondary amines to give amides, ammonium salts, diamides and/or cyclic imides.

Most expediently, the preparation of the terpolymers of the invention proceeds by first carrying out the reaction with the alcohols of the formula Q in solution, suspension or melt to give the mono- or diesters. To accelerate the di-esterification, which proceeds with elimination of water, catalysts, generally acids such as sulphuric acid or p-toluenesulphonic acid, may be added. To remove the water of reaction, the reaction is preferably carried out either in suspension or solution using a water-immiscible solvent, such as toluene or xylene, and the water of reaction is distilled off azeotropically. If the terpolymer to be reacted is insoluble in the solvent at the beginning of the reaction, it dissolves with increasing degree of esterification so at the end of the reaction a clear solution is formed.

The preferred temperature range for the formation of the mono- or diesters is in the range 60°–180° C., preferably 80°–140° C.

Subsequent to the mono-esterification, the amidation with primary and/or secondary amines of the formulae N and/or P is carried out, preferably in the same solvent, in the temperature range 50°–250° C., preferably 100°–200° C., the water being likewise removed azeotropically.

However, it is also possible to carry out the amidation reaction simultaneously with or prior to the esterification reaction. In the case of simultaneous esterification and amidation, the starting terpolymer is reacted with a mixture of alcohols of the formula Q and/or primary and/or secondary amines of the formulae N and/or P.

The terpolymers of the invention are particularly suitable as paraffin inhibitors for paraffin-containing crude oils and petroleumproducts which contain paraffin waxes, asphaltenes, resins, etc. Example of paraffin-containing petroleum products in the context of the invention are crude oils, distillation residues from petroleum refining or other paraffin-containing oils such as middle distillates (cf. for example, Compositions and Properties of Petroleum, F. Enke Publishers, Stuttgart, 1981, pages 1–37).

Paraffins here may be straight-chain or branched alkanes having about 10–50 carbon atoms.

The concentrations in which the paraffin inhibitors of the invention are used are generally 10–10,000 ppm, preferably 20–5,000 ppm, particularly preferably 50–1,000 ppm, in the petroleum product.

The optimum use concentration for a particular paraffin-containing oil can in each case be determined, for example, by determination of the pour point (DIN ISO 3016).

In the case of crude oils, for example, the addition of the paraffin inhibitors of the invention may take place either in the well or during transport, storage or further processing.

It has been found that the terpolymers of the invention in admixture with ethylene-vinyl ester copolymers possess an excellent action as paraffin dispersants in middle distillates. Furthermore, the terpolymers of the invention in admixture with ethylene-vinyl ester copolymers are suitable for lowering the cloud point (CP) in middle distillates. These mixtures usually contain from 50 to 1,000 ppm, preferably from 50 to 500 ppm, of the terpolymers of the invention and from 50 to 1,000 ppm, preferably from 50 to 500 ppm, of ethylene-vinyl ester copolymers. However, in addition to these copolymers, terpolymers which contain further comonomers besides ethylene and vinyl esters can equally be used. The terpolymers of the invention and ethylene-vinyl ester copolymers can also be added individually to middle distillates which already contain one of these components.

Suitable vinyl ester monomers are $C_1$–$C_{20}$-alkylvinyl esters, preferably $C_1$–$C_{12}$-alkylvinyl esters such as vinyl acetate, vinyl propionate, vinyl neononanoate and vinyl neodecanoate and also vinyl esters of saturated $C_{10}$–$C_{24}$ fatty acids. Further suitable comonomers are esters of unsaturated carboxylic acids, preferably the $C_1$–$C_{24}$-alkyl esters of acrylic acid, methacrylic acid and fumaric acid, and also $C_1$–$C_{10}$-alkylvinyl esters, diisobutylene, dimethylvinylcarbinol and vinyl methoxyacetate.

Such ethylene-vinyl ester copolymers and terpolymers are described in detail in the patent literature. For example, mention may be made of DE-B-11 47 799 (ethylene-vinyl acetate), DE-A-32 47 753 (ethylenealkenecarboxylic ester, vinyl carboxylate-vinyl ketone), U.S. Pat. No. 4,015,063 (ethylene, dimethylvinylcarbinol, vinyl esters of fatty acids), EP-A-203 554 (ethylene-diisobutylene-vinyl acetate), EP-A-309 897 (ethylene-vinyl methoxyacetate), and DE-A-40 42 206 (ethylene-vinylacetate-vinyl neononanoate or neodecanoate).

Preferred copolymers are those which essentially comprise
80–51% by weight of ethylene and
20–49% by weight of vinyl acetate or vinyl propionate.

Preferred terpolymers comprise
79–40% by weight of ethylene,
20–35% by weight, preferably 1–15% by weight, of vinyl acetate or vinyl propionate, and
1–25% by weight, preferably 1–15% by weight, of diisobutylene, vinyl neononanoate or vinyl neodecanoate.

Furthermore, it has been found that mixtures of the terpolymers of the invention, the above-described ethylene-vinyl ester copolymers and certain quaternary ammonium salts possess an excellent action as paraffin dispersants in middle distillates.

Suitable quaternary ammonium salts possess the formula

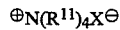

where $R^{11}$ may be identical or different and is $C_1$–$C_3$-alkyl, preferably $C_1$–$C_{22}$-alkyl, $C_1$–$C_{30}$-alkenyl, preferably $C_1$–$C_{22}$-alkenyl, benzyl or a radical of the formula —($CH_2$—$CH_2$—O)$_n$—$R^{12}$, where $R^{12}$ is hydrogen or a fatty acid radical of the formula C(O)—$R^{13}$, with $R^{13}$ being $C_6$–$C_{40}$-alkyl or $C_6$–$C_{40}$-alkenyl, n is a number from 1 to 30 and X is halogen, preferably chlorine, or methosulphate.

Examples which may be mentioned of such quaternary ammonium salts are: dihexadecyldimethylammonium chloride, distearyldimethylammonium chloride, quaternization products of esters of di- and triethanolamine with long-chain fatty acids (lauric acid, myristic acid, palmitic acid, stearic acid, behenic acid, oleic acid and mixtures of fatty acids such as coconut fatty acid, tallow fatty acid, hydrogenated tallow fatty acid and tall oil fatty acid), such as the distearyl ester of N-methyltriethanolammonium chloride, the distearyl ester of N-methyltriethanolammonium methosulphate, the distearyl ester of N,N-dimethyldiethanolammonium chloride, the dioleyl ester of N-methyltriethanolammonium, the trilauryl ester of N-methyltriethanolammonium methosulphate, the tristearyl ester of N-methyltriethanolammonium methosulphate and mixtures thereof.

These mixtures usually comprise from 50 to 1000 ppm, preferably from 50 to 500 ppm, of the terpolymers of the invention, from 50 to 1000 pm, preferably from 50 to 500 ppm, of ethylene-vinyl ester copolymers and from 50 to 1000 ppm, preferably from 50 to 500 ppm, of the quaternary ammonium salts.

The invention also provides the petroleum products stabilized against paraffin deposition by means of the paraffin inhibitors of the invention. The terpolymers and terpolymer/coadditive mixtures of the invention improve the low temperature behavior of these oils and thus improve the flow behavior in comparison with the prior art. In particular, the pour point and the viscosity are improved.

The improvement in the flow behavior can be established, for example, by determination of the pour point (in accordance with ASTM standard No. 97 B, Section 6 f) by measurements of the mounts of paraffin precipitated and also by viscosity measurements. The first method in particular, is widely used in practice and is usually matched to the practical conditions used in screening tests (for example, addition of the additive at 50° C. (actual pour point)).

The dispersion of the paraffin in middle distillates can be checked by storage of the additive-containing oil samples in a freezer at temperatures between −13° and −20° C. (carried out in accordance with M. Feustel et al., Science & Technology, Vol. 43, p. 396, FIG. 2 (1990)) with subsequent visual assessment of the sedimentation behavior and also determination of the CFPP value after separation of the oil sample into an upper and lower phase (EN 116).

EXAMPLES

General Preparative Procedure

The polymerization is carried out in a 2 l five-neck flask (having additional Claisen attachments if desired) fitted with anchor stirrer, reflux condenser, internal thermometer, gas inlet tube and up to 3 (heatable) dropping funnels. The solutions initially charged for polymerization are flushed with nitrogen prior to and during the polymerization. The intrinsic viscosity values K are determined by the method of Ubbelohde in toluene at a polymer concentration of 5% by weight. IR spectra are obtained from 1% strength by weight solutions in chloroform.

The allyl methyl polyglycols used are commercial products from Hoechst AG having the following characteristics: ®Polyglycol AM 250: average molecular weight=250 g/mol ®Polyglycol AM 350: average molecular weight=350 g/mol. ®Shellsol AB and Solvent Naphtha are commercial aromatic solvent mixtures boiling above 180° C. from Shell and Veba Oel respectively.

Example 1

Terpolymer of $C_{18}$-α-olefin, maleic anhydride and ®Polyglycol AM 350 in toluene A solution of 277.2 g (1.1 mol) of octadec-1-ene in 50 g of toluene is heated to 100° C. while passing in a stream of nitrogen. While stirring vigorously at this temperature, 88.2 g (0.9 mol) of molten maleic anhydride, 35 g (0.1 mol) of ®Polyglycol AM 350 and also an initiator solution comprising 3.5 g of tert-butyl peroxybenzoate and 3.5 g of tert-butyl peroxy-2-ethylhexanoate in 55.8 g of toluene are metered in from separate dropping funnels over a period of 3 hours. The mixture is stirred for a further 2 hours at 100° C. The resulting reddish brown polymer solution has a solids content of 48.2% and contains no unreacted maleic anhydride. The polymer has an K value of 16. IR bands at 1775 and 1855 cm$^{-1}$ show the presence of anhydrides.

Example 2

Terpolymer of $C_{18}$-α-olefin, maleic anhydride and ®Polyglycol AM 350 in Shellsol AB A solution of 252 g (1.0 mol) of $C_{18}$-α-olefin in 115 g of Shellsol AB is heated to 160° C. while passing in a stream of nitrogen. Over a period of 2 hours, 98 g (1.0 mol) of molten maleic anhydride, a solution of 3.5 g of di-tert-butyl peroxide and 3.5 g of tert-butyl peroxybenzoate in 85 g of Shellsol AB and also 70 g (0.2 mol) of ®Polyglycol AM 350 in 73.7 g of Shellsol AB are continuously added dropwise from separate dropping funnels. The mixture is stirred for a further 2 hours at 180° C. The resulting orange polymer solution has a dry residue of 46.2%; the resulting polymer has a K value of 17.

Example 3

Terpolymer of $C_{18}$-α-olefin, maleic anhydride and ®Polyglycol AM 350 in Shellsol AB A solution of 302.4 g (1.2 mol) of $C_{18}$-α-olefin in 115 g of Shellsol AB is heated to 180° C. while passing in a stream of nitrogen. Over a period of 2 hours, 88.2 g (0.9 mol) of molten maleic anhydride, a solution of 7 g of di-tert-butyl peroxide in 85 g of Shellsol AB and also 17.5 g (0.05 mol) of ®Polyglycol AM 350 in 76.68 g of Shellsol AB are continuously added dropwise. The mixture is stirred for a further 1 hour at 180° C. The resulting polymer solution has a dry residue of 45.9%; the resulting polymer has a K value of 17.

Example 4

Terpolymer of $C_{18}$-α-olefin, maleic anhydride and ®Polyglycol AM 250 in Shellsol AB 302.4 g of octadec-1-ene, 88.2 g of maleic anhydride and 12.5 g of ®Polyglycol AM 250 are polymerized at 180° C. analagously to Example 3. The resulting polymer has a K value of 15.

Example 5

Terpolymer of $C_{14-16}$-α-olefin, maleic anhydride and ®Polyglycol AM 350 in Shellsol AB 252 g of a mixture of tetradecene and hexadecene (1:1), 88.2 g of maleic anhydride and 17.5 g of ®Polyglycol AM 350 are polymerized at 180° C. analogously to Example 3. The resulting polymer has a K value of 15.

Example 6

Terpolymer of $C_{20-24}$-α-olefin, maleic anhydride and ®Polyglycol AM 350 in Shellsol AB 396.6 g (1.2 mol) of a $C_{20-24}$-α-olefin, 88.2 g of maleic anhydride and 17.5 g of ®Polyglycol AM 350 are polymerized at 180° C. analogously to Example 3. The resulting polymer has a K value of 18.

Example 7

Terpolymer of styrene, maleic anhydride and ®Polyglycol AM 350

To a solution of 98 g (1.0 mol) of maleic anhydride in 300 g of Shellsol AB are added dropwise, while stirring and passing in a stream of nitrogen, 99 g (0.95 mol) of styrene, a solution of 4.0 g of di-tert-butyl peroxide in 50 g of Shellsol AB and also a solution of 17.5 g (0.05 mol) of ®Polyglycol AM 350 in 50 ml of Shellsol AB in parallel at 160° C. over a period of 4 hours. A pale brown, 35% strength by weight polymer solution results.

Example 8

Terpolymer of $C_{18}$-α-olefin, maleic anhydride and stearyl ester of allylpolyglycol 277.2 g (1.2 mol) of $C_{18}$-α-olefin, 88.2 g (0.9 mol) of maleic anhydride and 17.5 g of the stearyl ester of allylpolyglycol (prepared by esterification of stearic acid with an ethoxylate of allyl alcohol containing 6 mol of ethylene oxide) are polymerized at 180° C. analogously to Example 3. The resulting polymer has a K value of 18.

Example 9

Terpolymer of $C_{14/16}$-α-olefin, maleic anhydride and allylbutylpolyglycol 334 g of a mixture of tetradecene and hexadecene (1:1), 118 g of maleic anhydride and 107 g of allylbutylpolyglycol (containing 24 mol of ethylene oxide and 8 mol of propylene oxide) in 376 g of Solvent Naphtha are polymerized at 180° C. analogously to Example 3. The resulting polymer has a K value of 16.

Example 10

Terpolymer of $C_{14/16}$-α-olefin, maleic anhydride and allylbutylpolyglycol 334 g of a mixture of tetradecene and hexadecene (1:1), 118 g of maleic anhydride and 107 g of allylbutylpolyglycol (containing 15 mol of ethylene oxide and 15 mol of propylene oxide) in 376 g of Solvent Naphtha are polymerized at 180° C. analogously to Example 3. The resulting polymer has a K value of 17.

Example 11

Reaction of the terpolymer of Example 1 with ditallow fatty amine to give the amide-ammonium salt 132.6 g of the polymer solution of Example 3 are admixed at 80° C. with 100 ml of toluene and 190 g of ditallow fatty amine and stirred for 2 hours at this temperature. The titratable nitrogen of the 66.5% strength by weight polymer solution is 0.73%. The IR spectrum shows no anhydride bands; bands at 1565 and 1620 cm$^{-1}$ show the formation of an amide-ammonium salt.

Example 12

Reaction of the terpolymer of Example 5 with ditallow fatty amine 50 g of the polymer solution of Example 5, containing 0.086 mol of anhydride groups, are admixed at 75° C. with 84 g of Shellsol AB and 86 g of ditallow fatty amine and stirred for 3 hours at this temperature. The titratable basic nitrogen of the 50% strength polymer solution is 0.8%.

Example 13

Reaction of the terpolymer of Example 5 with distearylamine

Analogously to Example 12, 50 g of the polymer solution of Example 5 are reacted with distearylamine.

Example 14

Reaction of the terpolymer of Example 3 with distearylamine 100 g of the polymer solution of Example 3, containing 0.13 mol of anhydride groups, are admixed at 80° C. with a solution of 130 g (0.26 mol) of distearylamine in 100 g of xylene and stirred for 3 hours at 150° C. The titratable basic nitrogen of the 50% strength by weight polymer solution is 0.51%.

Example 15

Reaction of the terpolymer of Example 3 with dicoconut fatty amine 100 g of the polymer solution of Example 3, containing 0.13 mol of anhydride groups, are admixed at 80° C. with a solution of 100 g (0.26 mol) of dicoconut fatty amine in 100 g of xylene and stirred for 3.5 hours at 160° C. The titratable basic nitrogen of the 50% strength by weight polymer solution is 0.62%.

Example 16

Reaction of the terpolymer of Example 3 with stearylamine and ditallow fatty amine 100 g of a polymer solution of Example 3, containing 0.13 mol of anhydride groups, are admixed at 80° C. with 33.9 g (0.13 mol) of stearylamine and stirred for 2 hours at this temperature. Subsequently 65 g (0.13 mol) of ditallow fatty amine in 93 g of xylene are added and the mixture is boiled for 3 hours at 150° C. on a water separator. The titratable basic nitrogen of the 50% strength by weight polymer solution is 0.15%.

Example 17

Reaction of the terpolymer of Example 7 with ditallow fatty amine

To 50 g of the polymer solution of Example 7, containing 0.063 mol of anhydride, is added a solution of 63.2 g (0.126 mol) of ditallow fatty amine in 58.6 g of Shellsol AB at a temperature of 75° C. while stirring. The mixture was stirred for a further 2 hours at this temperature. The resulting 50% strength by weight polymer solution contains 0.78% of titratable basic nitrogen.

Example 18

Reaction of the terpolymer of Example 1 with behenyl alcohol 181.0 g of the polymer solution (corresponding to 0.3 mol of maleic anhydride) of Example 1 and 94.1 g (0.3 mol) of behenyl alcohol are boiled under reflux for 3 hours at 150° C. The acid number is 58.

Example 19

Neutralization of the partially esterified terpolymer of Example 18 with distearylamine The partially esterified terpolymer solution of Example 18 is neutralized at 70° C. by addition of 143.6 g (0.3 mol) of molten distearylamine and is stirred for 1 hour at 70° C. The resulting, highly viscous, pale yellow polymer solution has a solids content of 78% and titratable basic nitrogen of 0.91%.

Example 20

Amidation of the partially esterified terpolymer of Example 18 with distearylamine The partially esterified terpolymer solution of Example 18 is admixed with 143.6 g (0.3 mol) of distearylamine and 226 g of toluene and boiled for 3 hours at 130°–140° C. on a water separator. The resulting 51% strength polymer solution contains 0.02% of titratable basic nitrogen. IR bands at 1735 and 1620 cm$^{-1}$ show the presence of ester and amide groups.

Example 21

Reaction of the terpolymer of Example 1 with benzyl alcohol and subsequent neutralization with distearylamine 216.6 g of the polymer solution of Example 1 and 34.2 g (0.32 mol) of benzyl alcohol are boiled under reflux for 3 hours at 140° C. The acid number of the partially esterified polymer solution is 80. After cooling to 45° C., 155.9 g of molten distearylamine are added, a temperature rise of 3° C. occurring. The mixture is stirred for 1 hour at 45° C. and subsequently discharged. The 80% strength by weight, highly viscous product has a titratable basic nitrogen of 0.98%.

Example 22

Reaction of the terpolymer of Example 1 with distearylamine

To 620 g of the polymer solution of Example 1 are added 467 g (1 mol) of distearylamine at 160° C. over a period of 4 hours and the mixture is maintained at this temperature for 1 hour. The titratable basic nitrogen of the 49% strength by weight polymer solution is 0.27%. IR bands at 1620 and 1720 cm$^{-1}$ indicate the presence of amide and carboxylic acid units.

Example 23

Reaction of the terpolymer of Example 9 with distearylamine and dicoconut fatty amine 62 g of the polymer solution of Example 9 (corresponding to 0.08 mol of anhydride groups) are admixed at 90° C. with a mixture of 39 g (0.078 mol) of distearylamine and 32 g (0.078 mol) of dicoconut fatty amine in 72 g of Solvent Naphtha and the mixture is stirred for 3 hours at this temperature. The titratable basic nitrogen of the 49% strength polymer solution is 0.64%.

Example 24

Reaction of the terpolymer of Example 10 with distearylamine and dicoconut fatty amine 62 g of the polymer solution of Example 10 (corresponding to 0.08 mol of anhydride groups) are admixed at 90° C. with a mixture of 39 g (0.078 mol) of distearylamine and 32 g (0.078 mol) of dicoconut fatty amine in 72 g of Solvent Naphtha and the mixture is stirred for 3 hours at this temperature. The titratable basic nitrogen of the 50% strength polymer solution is 0.65%.

Example 25

Preparation of a copolymer of maleic anhydride and C$_{18}$-α-olefin and subsequent reaction with ditallow fatty amine (comparison)

Analogously to Example 1, a solution of 277 g (1.1 mol) of C$_{18}$-α-olefin in 150 g of toluene is heated to 100° C. while passing in nitrogen. While stirring vigorously, 98 g (1 mol) of molten maleic anhydride and a solution of 3.5 g of tert-butyl peroxybenzoate and 3.5 g of tertbutyl peroxy-2-ethylhexanoate in 55.8 g of toluene are metered in over a period of 3 hours. The mixture is stirred for a further 3 hours. The resulting copolymer has a K value of 16. Analogously to Example 9, 85.8 g of the above polymer solution (containing 0.15 mol of anhydride groups) are converted into the amide-ammonium salt with 142 g (0.3 mol) of ditallow fatty amine.

APPLICATIONAL TESTING

1. Pour-point depressor for crude oils

The effectiveness of the terpolymers of the invention as flow improvers for mineral oils is described by the determination of the pour points in accordance with DIN ISO 3016. In this method, the crude oil samples with and without addition of the terpolymers are tested for flowability under defined conditions after prior heating and subsequent defined cooling. Pour point tests with the terpolymers of the invention were undertaken on two Columbian crude oils which in the untreated state had pour points of 13.5° C. (crude oil A) and 6° C. (crude oil B).

| Product | Amount added | Pour Point | |
|---|---|---|---|
| | | Crude Oil A | Crude Oil B |
| Terpolymer of Example 11 | 300 ppm | 10.3° C. | −1.9° C. |
| | 500 ppm | 8.4° C. | −2.1°. C. |
| | 1000 ppm | 5.3° C. | −3.5° C. |
| Terpolymer of Example 18 | 300 ppm | 9.5° C. | −1.3° C. |
| | 500 ppm | 7.9° C. | −4.1° C. |
| | 1000 ppm | 3.5° C. | −15.2° C. |

2. Paraffin dispersants for middle distillates

For the following tests, eight typical, representative winter diesel fuels from German refineries were used. These are hereinafter referred to as middle distillate I to VIII.

| | Middle distillate I | Middle distillate II | Middle distillate III | Middle distillate IV | Middle distillate V | Middle distillate VI | Middle distillate VII | Middle distillate VIII |
|---|---|---|---|---|---|---|---|---|
| Cloud Point (CP) (°C.) | −5 | −6 | −8 | −0 | −8 | −6 | −1 | +3 |
| CFPP (°C.) | −8 | −10 | −13 | −10 | −8 | −11 | −4 | +/−0 |
| Density/20° C. (g/ml) | 0.822 | 0.817 | 0.812 | 0.837 | 0.822 | 0.819 | 0.030 | 0.827 |
| Initial boiling point (°C.) | 163 | 173 | 167 | 183 | 173 | 169 | 171 | 169 |
| 20% boiling point (°C.) | 207 | 219 | 217 | 225 | 221 | 219 | 252 | 241 |
| 90% boiling point (°C.) | 341 | 362 | 324 | 338 | 333 | 330 | 353 | 361 |
| Final boiling point (°C.) | 373 | 382 | 359 | 361 | 358 | 362 | 368 | 384 |

The flow improvers (FI) are:
FI (A) ethylene-vinyl acetate copolymer (containing about 27% of vinyl acetate) melt viscosity (140° C.) of 200 mPa.s
FI (B) ethylene-vinyl acetate copolymer (containing about 30% of vinyl acetate) average molecular weight of about 1500.
Description of the test method
The middle distillates are first tested separately, with flow improver and in combination with paraffin dispersant, for the turbidity and paraffin sedimentation phenomena induced by cold. After placing the samples in a freezer and running through a specific cooling programme (see M. Feustel et al., Science & Technology, Vol. 43, p. 396, FIG. 2 (1990)), the samples are, after 72 hours, assessed at −13° C. for dispersion. Middle distillate volumes of 20 ml and 100 ml are used for these tests. In addition, after the visual assessment of the 100 ml samples, the upper phase (50% by volume) is drawn off from these at low temperature. The cloud point (CP) and the cold filter plugging point (CFPP) are subsequently determined on both the upper and lower phases. The determination of the cloud point (CP) is carried out in accordance with DIN 51597 by cooling the oil sample and optical measurement of the cloud point. The temperature at which the first paraffin precipitation leads to turbidity is the cloud point (CP). The measurement of the cloud point (CP) is carried out in a Herzog CP SC 815 apparatus. The cold filter plugging point (CFPP) is determined in accordance with European Standard EN 116.

It can be seen that paraffin dispersion is achieved by adding the additives of the invention.

Furthermore, a lowering of the cloud point (CP) is achieved (Table IV).

Abbreviations in the following tables:

| | |
|---|---|
| FI = | Middle distillate flow improver |
| PD = | Paraffin dispersant |
| PD(1) = | of Example 11 |
| PD(2) = | of Example 12 |
| PD(3) = | of Example 13 |
| PD(4) = | of Example 14 |
| PD(5) = | of Example 25 (comparative example) |
| PD(6) = | of Example 19 |
| QAS = | quaternary ammonium salt, here the distearyl ester of N-methyltriethanol-ammonium methosulphate |

Assessment codes:

| | |
|---|---|
| C = | clear |
| T = | turbid |
| ST = | slightly turbid |
| S = | sediment |
| D = | dispersed, hardly any sediment |

TABLE I

| FI | Conc. (ppm) | PD | Conc. (ppm) | QAS (ppm) | Oil phase | Sediment depth (cm) | Volume fraction (%) |
|---|---|---|---|---|---|---|---|
| Middle distillate I   CP −5° C./CFPP −8° C. | | | | | | | |
| FI(A) | 100 | — | — | — | C | 1.6 | 15 |
| FI(A) | 400 | — | — | — | C | 1.9 | 17 |
| FI(B) | 100 | — | — | — | C | 1.4 | 13 |
| FI(B) | 400 | — | — | — | C | 1.7 | 15 |
| FI(A) | 400 | PD(1) | 200 | — | T | 0.8 | 7 |
| FI(A) | 400 | PD(1) | 400 | — | T | 0.5 | 5 |
| FI(A) | 400 | PD(1) | 300 | 200 | T | 0.0 | 0 |
| FI(B) | 400 | PD(1) | 300 | 150 | T | 0.1 | 1 |
| Middle distillate II   CP −6° C./CFPP −10° C. | | | | | | | |
| FI(A) | 100 | — | — | — | C | 1.4 | 13 |
| FI(B) | 100 | — | — | — | C | 1.0 | 9 |
| FI(A) | 200 | — | — | — | C | 1.4 | 13 |
| FI(A) | 200 | PD(2) | 200 | — | ST | 0.5 | 5 |
| FI(A) | 200 | PD(2) | 350 | — | T | 0.3 | 2 |
| FI(A) | 200 | PD(2) | 500 | — | T | 0.1 | 1 |
| FI(A) | 200 | PD(4) | 200 | — | T | 0.7 | 6 |
| FI(B) | 200 | PD(4) | 500 | — | T | 0.2 | 2 |
| Middle distillate III   CP −5° C./CFPP −8° C. | | | | | | | |
| FI(B) | 100 | — | — | — | C | 1.7 | 15 |
| FI(B) | 200 | — | — | — | C | 1.8 | 16 |
| FI(B) | 200 | PD(3) | 100 | — | C | 1.0 | 9 |
| FI(B) | 200 | PD(3) | 200 | — | ST | 0.5 | 5 |
| FI(B) | 200 | PD(3) | 300 | — | T | 0.2 | 2 |
| FI(B) | 200 | PD(3) | 500 | — | T | 0.2 | 2 |
| FI(B) | 2400 | PD(3) | 200 | 100 | T | 0.1 | 1 |
| FI(B) | 200 | PD(3) | 500 | 200 | T | 0.1 | 1 |

TABLE II

| | | | | Middle distillates I CP −5° C./CFPP −8° C. | | | Lower phase | | Upper phase | |
|---|---|---|---|---|---|---|---|---|---|---|
| FI | Conc. (ppm) | PD | Conc. (ppm) | QAS (ppm) | Paraffin sediment (% by volume) | Paraffin in oil phase | Dispersion | CP °C. | CPFF °C. | CP °C. | CPFF °C. |
| FI(A) | 200 | — | — | — | 14 | C | S | −1 | −16 | −10 | −32 |
| FI(A) | 400 | — | — | — | 19 | C | S | −1 | −13 | −11 | −33 |
| FI(A) | 400 | PD(1) | 400 | — | 4 | T | D | −1 | −20 | −13 | −38 |
| FI(A) | 400 | PD(1) | 50 | 200 | 7 | T | S | −2 | −29 | −13 | −36 |
| FI(A) | 400 | PD(1) | 100 | 200 | 5 | T | D | −2 | −29 | −12 | −37 |
| FI(A) | 400 | PD(1) | 200 | 200 | 2 | T | D | −3 | −28 | −11 | −37 |
| FI(A) | 400 | PD(1) | 300 | 200 | 1 | T | D | −4 | −32 | −11 | −37 |
| FI(A) | 400 | PD(5) | 400 | — | 7 | ST | S | −1 | −17 | −12 | −34 |

TABLE III

| | | | | | Middle distillates I CP −5° C./CFPP −8° C. | | | Lower phase | | Upper phase | |
|---|---|---|---|---|---|---|---|---|---|---|---|
| FI | Conc. (ppm) | PD | Conc. (ppm) | QAS (ppm) | Paraffin sediment (% by volume) | Paraffin in oil phase | Dispersion | CP °C. | CPFF °C. | CP °C. | CPFF °C. |
| FI(B) | 200 | — | — | — | 21 | C | S | 0 | −11 | −15 | −30 |
| FI(B) | 200 | PD(2) | 250 | — | 10 | C | S | −2 | −19 | −14 | −24 |
| FI(B) | 200 | PD(2) | 200 | 150 | 8 | ST | S | −2 | −21 | −14 | −31 |
| FI(B) | 200 | PD(2+3) | 200 | 50 | 7 | ST | D | −3 | −28 | −14 | −31 |
| FI(A) | 200 | — | — | — | 19 | C | S | −1 | −10 | −14 | −28 |
| FI(A) | 200 | PD(2) | 250 | — | 8 | ST | S | −2 | −23 | −12 | −29 |
| FI(A) | 200 | PD(2) | 200 | 150 | 5 | T | D | −3 | −26 | −12 | −30 |

TABLE IV

| | CP-Value (°C.) | | | | Difference (K) | |
|---|---|---|---|---|---|---|
| Middle distillate | Without additive | +150 ppm FI(A) | 400 ppm PD(6) | 800 ppm PD(6) | ΔT₁ | ΔT₂ |
| Middle distillate IV | −8.1 | −8.1 | −10.1 | −10.9 | 2.0 | 2.0 |
| Middle distillate V | −8.4 | −8.4 | −10.7 | −10.7 | 2.1 | 2.3 |
| Middle distillate VI | −5.7 | −5.7 | −7.4 | −7.7 | 1.7 | 2.0 |
| Middle distillate VII | −0.9 | −0.9 | −2.1 | −2.4 | 1.2 | 1.5 |
| Middle distillate VIII | +3.0 | +3.0 | +2.1 | +1.2 | 0.9 | 1.8 |

What is claimed is:

1. A copolymer based on $\alpha,\beta$-unsaturated dicarboxylic anhydrides, $\alpha,\beta$-unsaturated compounds and polyoxyalkylene ethers of lower unsaturated alcohols, which comprises components a) 20–80 mol % of bivalent structural units A

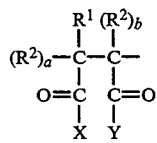

where $R^1$ and $R^2$ are, independently of one another, hydrogen or methyl, a and b are zero or one and a+b is one, X and Y are identical or different and are the —N—HR$^3$ group, where $R^3$ is $C_6$–$C_{40}$-alkyl, $C_5$–$C_{20}$-cycloalkyl or $C_6$–$C_{18}$-aryl, the —N—(R$^3$)$_2$ group, where $R^3$ is identical or different and is as defined above, and/or the —O—R$^4$ group, where $R^4$ is hydrogen, a cation of the formula $H_2N^{\oplus}(R^{-3})_2$ or $H_3N^{\oplus}R^3$, $C_6$–$C_{40}$-alkyl, $C_5$–$C_{20}$-cycloalkyl or $C_6$–$C_{18}$-aryl, b) 19–80 mol % of bivalent structural units D

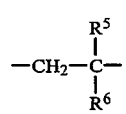

in which $R^5$ is hydrogen or $C_1$–$C_4$-alkyl and $R^6$ is $C_6$–$C_{60}$-alkyl or $C_6$–$C_{18}$-aryl, and c) 1–30 mol % of bivalent structural units E

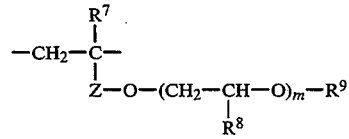

in which $R^7$ is hydrogen or methyl, $R^8$ is hydrogen or $C_1$–$C_4$-alkyl,

Z is $C_1$–$C_4$-alkylene m is a number from 1 to 100, $R^9$ is $C_1$–$C_{24}$-alkyl, $C_5$–$C_{20}$-cycloalkyl, $C_6$–$C_{18}$-aryl or —C(O)—R$^{10}$, where $R^{10}$ is $C_1$–$C_{40}$-alkyl, $C_5$–$C_{10}$-cycloalkyl or $C_6$–$C_{18}$-aryl.

2. A copolymer as claimed in claim 1, containing bivalent structural units of the formula A, in which X is a group of the formula O—R$^4$, with $R^4$ being $C_6$–$C_{40}$-alkyl and Y is a group of the formula O—R$^4$, where $R^4$ is a cation of the formula $H_2N^{\oplus}(R^3)_2$ with $R^3$ being $C_6$–$C_{40}$-alkyl.

3. A copolymer as claimed in claim 1, containing bivalent structural units of the formula A, in which X is a group of the formula —N(R$^3$)$_2$ with $R^3$ being $C_6$–$C_{40}$-alkyl and Y is a group of the formula O—R$^4$, where $R^4$ is a cation of the formula $H_2N^{\oplus}(R^3)_2$ with $R^3$ being $C_6$–$C_{40}$-alkyl.

4. A copolymer as claimed in claim 2, wherein $R^3$ and $R^4$ are $C_6$–$C_{24}$-alkyl.

5. The copolymer as claimed in claim 1, further comprising divalent structural unit B partially replaces bivalent structural unit A

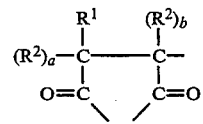

wherein $R^1$ and $R^2$, a and b are defined in claim 1.

6. The copolymer as claimed in claim 1, further comprising structural unit C partially replaces structural unit A of the copolymer

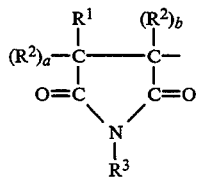

and wherein $R^1$, $R^2$, a, b and $R^3$ are defined in claim 1.

7. A copolymer as claimed in claim 6, further comprising that bivalent structural units B partially replaces structural unit A, wherein structural units A, B, and C are present in an amount from 20 to 80 mol %,

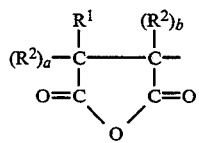

wherein the definitions of $R^1$, $R^2$, A and B are defined in the definition of formula (A).

8. The copolymers as claimed in claim 1, wherein component a) is present in an amount from 40 to 60 mol %, component b) is present in an amount from 39 to 60 mol % and component c) is present in an amount from 1 to 20 mol %.

9. The copolymers as claimed in claim 5, wherein component a) is present in an amount from 40 to 60 mol %, component b) is present in an amount from 39 to 60 mol % and component c) is present in an amount from 1 to 20 mol %.

10. The copolymers as claimed in claim 6, wherein component a is present in an amount from 40 to 60 mol %, component b is present in an amount from 39 to 60 mol % and component c is present in an amount from 1 to 20 mol %.

11. The copolymer as claimed in claim 8, wherein $R^4$ is phenyl.

12. The copolymer as claimed in claim 10, wherein $R^3$ and $R^4$ are identical or different and are $C_{10}$–$C_{24}$-alkyl, cyclopentyl or cyclohexyl.

13. The copolymer as claimed in claim 1, wherein $R^3$, $R^4$, $R^9$ and $R^{10}$ are identical or different and are a cyclopentyl or cyclohexyl.

14. A copolymer as claimed in claim 5, containing bivalent structural units of the formula A, in which
S is a group of the formula O—$R^4$, with
$R^4$ being $C_6$–$C_{40}$-alkyl and
Y is a group of the formula O—$R^4$, where
$R^4$ is a cation of the formula $H_2N^{\oplus}(R^3)_2$ with
$r^3$ being $C_6$–$C_4$-alkyl.

15. A copolymer as claimed in claim 5, containing bivalent structural units of the formula A, in which
X is a group of the formula —$N(R^3)_2$ with $R^3$ being $C_6$–$C_{40}$-alkyl and
Y is a group of the formula O—$R^4$, where $R^4$ is a cation of the formula $H_2N^{\oplus}(R^3)_2$ with $R^3$ being $C_6$–$C_{40}$-alkyl.

16. A copolymer as claimed in claim 5, where $R^3$ and $R^4$ are $C_6$–$C_{24}$-alkyl.

* * * * *